(12) United States Patent
Kaiser

(10) Patent No.: US 10,570,890 B2
(45) Date of Patent: Feb. 25, 2020

(54) DEVICE FOR MOUNTING A LINE PIPE IN A ROTOR SHAFT OF A WIND TURBINE, ROTOR SHAFT AND WIND TURBINE

(71) Applicant: Nordex Energy GmbH, Hamburg (DE)

(72) Inventor: Uwe Kaiser, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 559 days.

(21) Appl. No.: 15/349,819

(22) Filed: Nov. 11, 2016

(65) Prior Publication Data
US 2017/0130701 A1 May 11, 2017

(30) Foreign Application Priority Data
Nov. 11, 2015 (EP) .................................... 15194011

(51) Int. Cl.
| | |
|---|---|
| *F03D 80/00* | (2016.01) |
| *F03D 80/80* | (2016.01) |
| *F03D 15/00* | (2016.01) |
| *F03D 1/06* | (2006.01) |

(52) U.S. Cl.
CPC .......... *F03D 80/85* (2016.05); *F03D 1/0691* (2013.01); *F03D 15/00* (2016.05); *F03D 80/00* (2016.05); *F03D 80/88* (2016.05); *F05B 2240/61* (2013.01); *F05B 2260/30* (2013.01)

(58) Field of Classification Search
CPC .......... F03D 80/85; F03D 15/00; F03D 80/00; F03D 80/88; F03D 1/0691; F05B 2240/61; F05B 2260/30
USPC ............ 248/123.11, 123.2, 331, 364, 49, 62, 248/67.7, 70
See application file for complete search history.

(56) References Cited

U.S. PATENT DOCUMENTS

| | | | |
|---|---|---|---|
| 8,313,297 B2 | 11/2012 | Gopfert et al. | |
| 2009/0179428 A1 | 7/2009 | Achenbach | |
| 2013/0187013 A1* | 7/2013 | Minami | ............... B64D 37/005 248/70 |
| 2013/0292950 A1 | 11/2013 | Ritschel et al. | |

* cited by examiner

*Primary Examiner* — Richard A Edgar
(74) *Attorney, Agent, or Firm* — Walter Ottesen, P.A.

(57) ABSTRACT

A device for mounting a line pipe in a rotor shaft of a wind turbine. The invention also relates to a rotor shaft for a wind turbine and to the wind turbine itself. The device includes a rotor shaft which is configured to be partially hollow and in which the line pipe is arranged. In the line pipe, different media are routed from a fixed nacelle of the wind turbine in the direction of a rotor hub connected to the rotor shaft. These can be not only electrical lines but also optical waveguides and media lines for gases and liquids. The mounting of the line pipe is achieved by a device having a plurality of eccentric fixing elements, wherein the line pipe is oriented concentrically by rotating the eccentric fixing elements.

8 Claims, 3 Drawing Sheets

DEVICE FOR MOUNTING A LINE PIPE IN A ROTOR SHAFT OF A WIND TURBINE, ROTOR SHAFT AND WIND TURBINE

CROSS REFERENCE TO RELATED APPLICATION

This application claims priority of European patent application no. 15 194 011.1, filed Nov. 11, 2015, the entire content of which is incorporated herein by reference.

FIELD OF THE INVENTION

The invention relates to a device for mounting a line pipe in a rotor shaft of a wind turbine. The invention also relates to a rotor shaft for a wind turbine and to the wind turbine itself.

BACKGROUND OF THE INVENTION

The rotor hub of a wind turbine contains various systems, such as, for example, the blade pitch angle controller (pitch controller) for the rotor blades which are controlled by a central management system of the wind turbine. In order to control them, but also to transmit signals from the blade pitch angle controller (pitch controller) to the management system, a data transmitter is required between the rotating rotor hub and the stationary nacelle.

In wind turbines, slip ring transmitters have proved themselves when transmitting electrical signals and electrical power between a rotating rotor hub and a fixed nacelle. For the transmission of the electrical signals, recourse can be had to an electrical, optical, inductive or capacitive transmission path.

For the transmission of liquid or gaseous substances, rotary media leadthroughs via which, for example, water, oils or gases can be transmitted have proved themselves.

The electrical blade pitch angle control (pitch control) in wind turbines is often achieved by a slip ring system which, as a transmission device, transmits electrical energy and signals from the fixed electrical system of the nacelle of the wind turbine into the pitch system, which rotates with the rotor of the wind turbine, in the rotor hub assembly. For this purpose, a fixed line pipe (also pitch pipe) which receives and protects the electrical lines routed from the fixed nacelle into the rotating rotor hub extends within a core bore in the rotor shaft. The line pipe is customarily mounted, on the one hand, behind the gearbox and, on the other hand, on the rotor shaft flange, which is provided to fasten the rotor shaft to the rotor hub, by a second bearing arranged there. In this way, the rotor shaft rotates about the line pipe.

U.S. Pat. No. 8,313,297 discloses a rotor shaft for a wind turbine, wherein the rotor shaft is at least partially hollow. Arranged in the rotating rotor shaft are a line pipe which receives electrical lines and a transmission device which produces an electrical connection between a fixed nacelle and a rotating rotor of the wind turbine. The line pipe is supported in the rotor shaft via two bearings, wherein one bearing is arranged on the housing of the transmission device in the region of the end of the rotor shaft that faces the rotor hub and a second bearing is arranged in the region of the end of the rotor shaft that faces away from the rotor hub.

SUMMARY OF THE INVENTION

It is an object of the invention to provide a device for mounting a line pipe in a rotor shaft that allows simple mounting and simplifies the work in the rotor hub interior. In addition, it is intended for the installation spaces in front of and behind the device to be sealed in an oil-tight manner with respect to one another.

The object is, for example, achieved by a device for mounting a line pipe in a rotor shaft of a wind turbine. The line pipe routes lines for different media from a fixed nacelle of the wind turbine in the direction of a rotor hub connected to the rotor shaft. The rotor shaft is partially hollow. The device includes a plurality of eccentric fixing elements configured to be rotated so as to orient the line pipe concentrically.

Furthermore, it is an object to provide a corresponding rotor shaft for a wind turbine that can receive a device according to the invention and a transmission device.

The device according to the invention for mounting a line pipe in a rotor shaft of a wind turbine includes a rotor shaft which is configured to be partially hollow and in which the line pipe is arranged. In the line pipe, different media are routed from a fixed nacelle of the wind turbine in the direction of a rotor hub connected to the rotor shaft. These can be not only electrical lines but also optical waveguides and media lines for gases and liquids. The mounting according to the invention of the line pipe is achieved by a device having a plurality of eccentric fixing elements, wherein the line pipe is oriented concentrically by rotating the eccentric fixing elements.

According to a preferred embodiment, two circular discs are connected to one another via at least three rotatable spacers which in turn are fixedly connected to at least one eccentric fixing element. Six eccentric fixing elements are preferably arranged, a different number of eccentric fixing elements also being possible.

A u-shaped spacer plate is arranged in each case between two rotatable spacers and fixedly connected to the two discs.

The eccentric fixing elements are embodied in the form of a circle segment with an outer circular arc, wherein the outer circular arc has a constant outer radius. The center point of the outer circular arc of each eccentric fixing element is situated outside the axis of rotation of the rotatable spacers.

The circular discs are provided with in each case a centrally arranged circular cutout. Between the two discs, a bearing for mounting the line pipe is fixedly connected to one of the discs. The discs are provided with a seal at their outer edge over their entire circumference.

The rotor shaft according to the invention of a rotor for a wind turbine is at least partially hollow, with the result that a rotor shaft interior is formed which is connected to a rotor hub. The rotor shaft interior has a cylindrical axial space facing the rotor hub and an axial leadthrough, facing away from the rotor hub, for a fixed line pipe, wherein the cylindrical axial space has a larger radial diameter than the axial leadthrough, with the result that a shoulder is arranged between the cylindrical axial space and the axial leadthrough. A removable device for rotatably mounting the line pipe is arranged directly in front of the axial leadthrough and connected in a force-fitting manner to the rotor shaft, with the result that the axial leadthrough is thus sealed.

In an embodiment, a transmission device for different media, in particular electricity, light, gases and fluids, is arranged completely in the rotor shaft and produces a connection between a fixed nacelle and the rotating rotor.

Furthermore, protection is sought for a wind turbine having a rotor shaft in accordance with the preceding features.

The solution is distinguished by the fact that the construction can be used in restricted mounting spaces. Simple centering is made possible by the device according to the invention. In addition, the spaces in front of and behind the device are sealed with respect to one another.

BRIEF DESCRIPTION OF THE DRAWINGS

The invention will now be described with reference to the drawings wherein.

DESCRIPTION OF THE PREFERRED EMBODIMENTS OF THE INVENTION

Unless otherwise stated, identical reference signs designate identical objects in the figures.

Figure 1:
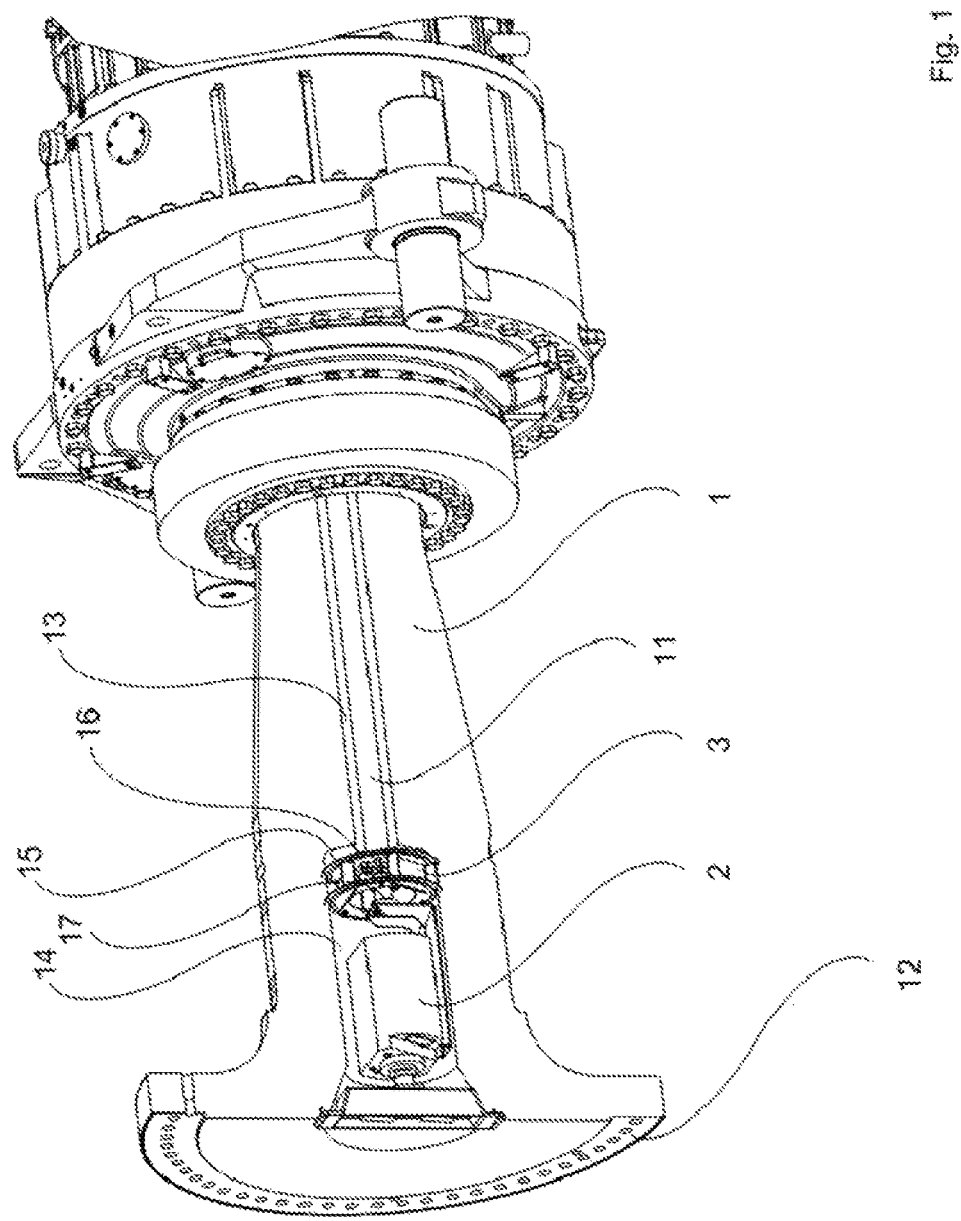
FIG. 1 shows a rotor shaft and a gearbox in a three-dimensional side view with the device according to the invention arranged therein.

FIG. 1 shows a rotor shaft 1, which is configured to be hollow in part, of a wind turbine (not shown in more detail). The rotor shaft 1 has a flange 12 by which it is fastened to a rotor hub (not shown here) of the wind turbine. A fixed line pipe 11 (pitch pipe) extends coaxially within the rotor shaft 1 rotating with the rotor hub. The line pipe 11 routes electrical lines from the fixed nacelle (not shown) of the wind turbine in the direction of the end of the rotor shaft 1 that faces the rotor hub. The rotor shaft interior is subdivided into an axial leadthrough 13 for the fixed line pipe 11 and a cylindrical axial space 14. The cylindrical axial space 14 faces the rotor hub and the axial leadthrough 13 is situated at the end facing away from the rotor hub. The cylindrical axial space 14 has a larger radial diameter than the axial leadthrough 13, with the result that a shoulder 15 is situated between them both. The line pipe 11 is connected via a fixed coupling 17 to a transmission device 2, which is arranged completely within the rotor shaft 1, for electrical connection between the fixed nacelle and the rotating rotor hub. At its end facing away from the rotor hub, the transmission device 2 has a bearing 16 via which the housing of the transmission device 2 is mounted opposite the line pipe 11. It is also possible for the line pipe 11 not to be mounted opposite the transmission device 2. The device 3 according to the invention for mounting the line pipe 11 is arranged directly in front of the axial leadthrough 13 and connected in a force-fitting manner to the rotor shaft 1. The axial leadthrough 13 is sealed by the device 3.

Figure 2:
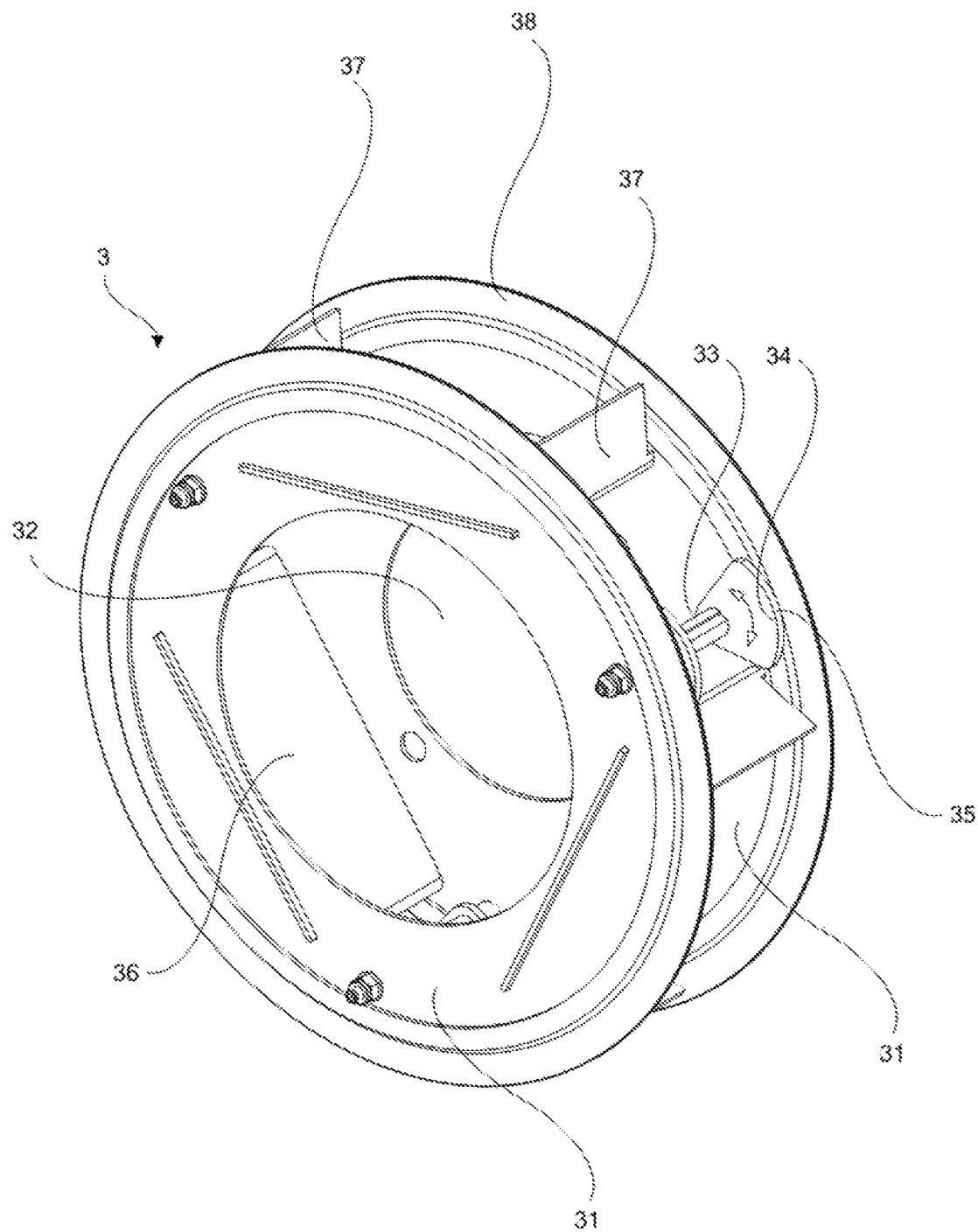
FIG. 2 shows the device according to the invention in a three-dimensional front view without the bearing inserted.

The device 3 according to the invention is shown in a three-dimensional front view in FIG. 2. It includes two circular discs 31 having in each case a centrally arranged circular cutout 32. The two discs 31 are connected to one another by preferably three spacers 33. A different number of spacers 33 is conceivable. Furthermore, to increase the stability of the entire construction, a u shaped spacer plate 36 is arranged in each case between two spacers 33 and fixedly connected to the two discs 31. Here, the two legs 37 of the u shaped spacer plates 36 point in the direction of the outer diameter of the discs 31. The bent-off regions (legs 37) of the spacer plates 36 prevent the entire device 3 from being able to tilt within the rotor shaft 1. The discs 31 are each provided with a seal 38 at their outer edge over their entire circumference.

The spacers 33 are arranged rotatably between the discs 31 and can be moved from outside, for example via a hexagon key. Two eccentric fixing elements 34 in the form of a circle segment with an outer circular arc 35 are arranged on each spacer 33, wherein this outer circular arc 35 has a constant outer radius and points in the direction of the inner wall of the cylindrical axial space 14. The center point of the outer circular arc 35 is situated outside the axis of rotation of the rotatable spacers 33. The eccentricity of the fixing elements 34 accordingly results from the non-coinciding axes of rotation of the spacers 33 and the movement axes of the fixing elements 34.

Figure 3:
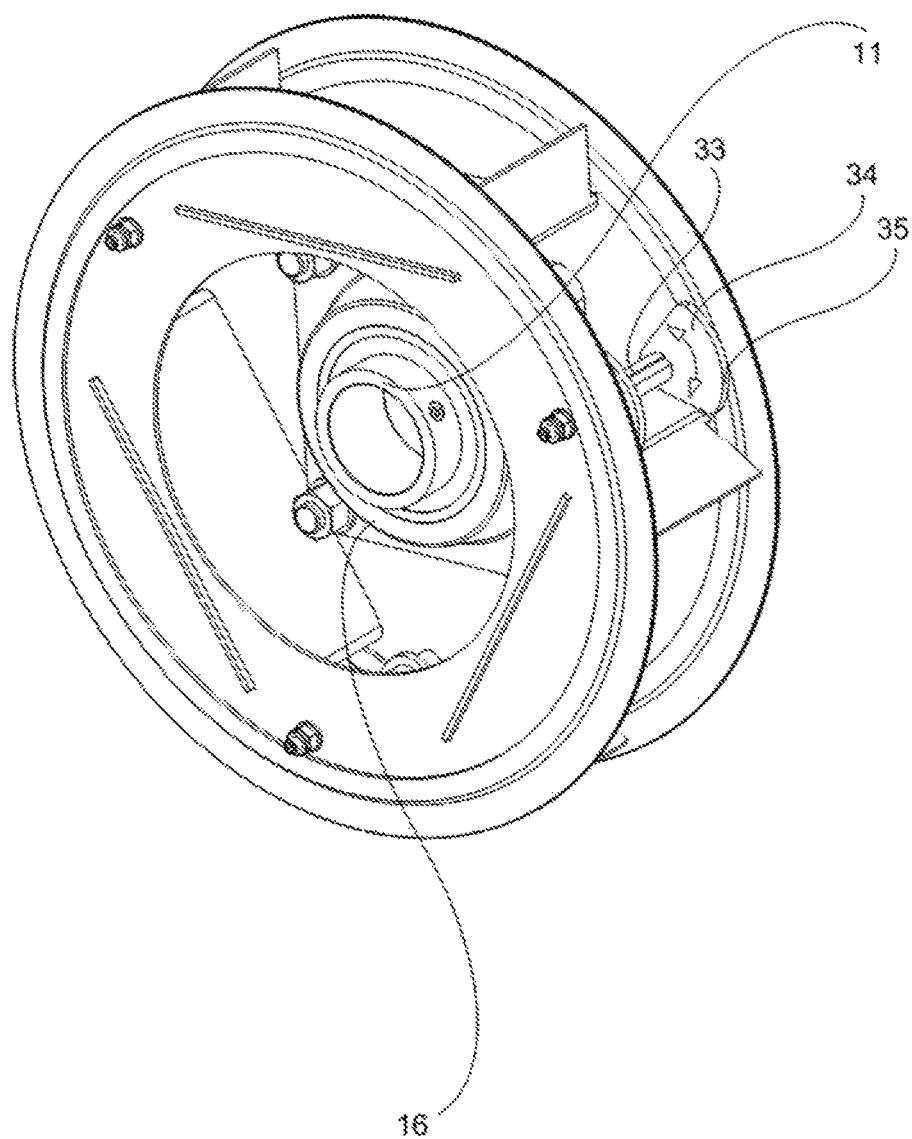
FIG. 3 shows the device according to the invention in a three-dimensional front view with the bearing inserted; and, FIG. 4 shows a detail view of a spacer with two eccentric fixing elements arranged thereon.

A bearing 16 is arranged in the circular cutout 32 of that disc 31 which points towards the shoulder 15, and is fixedly connected to this disc 31, as can be seen in FIG. 3. The line pipe 11 is rotatably mounted in the bearing 16. For concentric mounting of the line pipe 11, the device 3 must be oriented within the cylindrical axial space 14. For this purpose, use is made of the six eccentric fixing elements 34, which can be readily moved via a rotary movement of the spacers 33, for example via a hexagon key.

When mounting the rotor shaft 1, the device 3 is pushed onto the line pipe 11 in the cylindrical axial space 14 up to the shoulder 15. For this purpose, the eccentric fixing elements 34 are turned inwards, preferably to the left. The bearing 16 is then pushed onto the line pipe 11 and fastened to the disc 31 directed towards the axial leadthrough 13. For this purpose, it is expedient for the, in this case outer, disc 31 to have a larger cutout 32 than the inwardly directed one. The bearing 16 and thus the line pipe 11 are oriented concentrically by rotating the concentric fixing elements 34.

Figure 4:
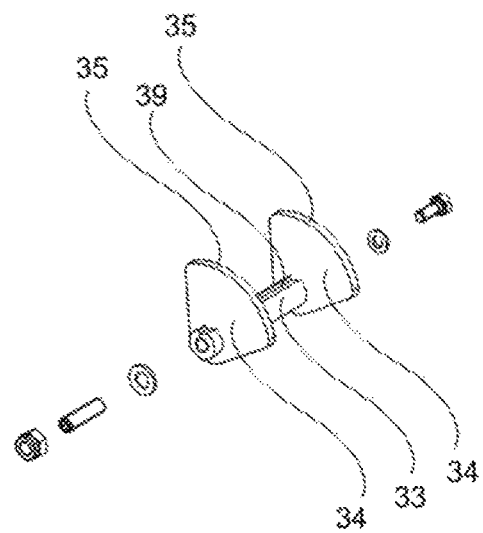

FIG. 4 shows a detail view of a spacer 33 with two eccentric fixing elements 34 arranged on the end sides thereof and the corresponding fastening accessories in an exploded illustration. The two eccentric fixing elements 34 are positively secured against twisting on the spacer 33 by being fixed in a rabbet 39 of the spacer 33.

It is understood that the foregoing description is that of the preferred embodiments of the invention and that various changes and modifications may be made thereto without departing from the spirit and scope of the invention as defined in the appended claims.

REFERENCE NUMERALS

1 Rotor shaft
11 Line pipe
12 Flange
13 Axial leadthrough
14 Cylindrical axial space
15 Shoulder
16 Bearing
17 Coupling
2 Transmission device
3 Device
31 Circular discs
32 Circular cutout
33 Spacer
34 Eccentric fixing elements
35 Outer circular arc
36 u-shaped spacer plates
37 Leg of the u-shaped spacer plates 36
39 Rabbet in the spacer 33

What is claimed is:

1. A device for mounting a line pipe in a rotor shaft of a wind turbine, wherein the line pipe routes lines for different media from a fixed nacelle of the wind turbine in the direction of a rotor hub connected to the rotor shaft, wherein the rotor shaft is partially hollow, the device comprising:
- a plurality of eccentric fixing elements configured to be rotated so as to orient the line pipe concentrically;
- at least three rotatable spacers fixedly connected to at least one of said eccentric fixing elements; and,
- two circular discs connected to one another via said at least three rotatable spacers.

2. The device of claim 1, wherein said plurality of eccentric fixing elements includes six eccentric fixing elements.

3. The device of claim 1, wherein:
- said plurality of eccentric fixing elements are embodied in the form of a circle segment having an outer circular arc; and,
- said outer circular arc has a constant outer radius.

4. The device of claim 1, wherein said circular discs each define a centrally arranged circular cutout.

5. The device of claim 1 further comprising:
- a bearing configured for mounting the line pipe; and,
- said bearing being disposed between said two discs and fixedly connected to one of said two discs.

6. The device of claim 1 further comprising:
- a plurality of u-shaped spacer plates; and,
- one of said plurality of u-shaped spacer plates being arranged between each two mutually adjacent ones of said rotatable spacers and being fixedly connected to each of said two mutually adjacent discs.

7. The device of claim 1, wherein said two discs each define a respective outer edge and a respective circumference; and, each of said two discs has a seal at said respective outer edge over the entirety of said respective circumference.

8. A device for mounting a line pipe in a rotor shaft of a wind turbine, wherein the line pipe routes lines for different media from a fixed nacelle of the wind turbine in the direction of a rotor hub connected to the rotor shaft, wherein the rotor shaft is partially hollow, the device comprising:
- a plurality of eccentric fixing elements configured to be rotated so as to orient the line pipe concentrically;
- said plurality of eccentric fixing elements are embodied in the form of a circle segment having an outer circular arc;
- said outer circular arc has a constant outer radius;
- at least three rotatable spacers fixedly connected to at least one of said eccentric fixing elements;
- said at least three rotatable spacers defining an axis of rotation;
- said outer circular arc of each of said eccentric fixing elements defining a center point of said outer circular arc; and,
- said center point of each eccentric fixing element being disposed outside said axis of rotation of a corresponding one of said rotatable spacers.

\* \* \* \* \*